United States Patent [19]

Makrides

[11] 4,298,584
[45] Nov. 3, 1981

[54] REMOVING CARBON OXYSULFIDE FROM GAS STREAMS

[75] Inventor: Alkis C. Makrides, Newton Center, Mass.

[73] Assignee: EIC Corporation, Newton, Mass.

[21] Appl. No.: 156,682

[22] Filed: Jun. 5, 1980

[51] Int. Cl.³ .............................................. B01D 53/34
[52] U.S. Cl. .................................... 423/242; 423/522; 423/530; 423/557; 423/561 R; 423/566
[58] Field of Search ............... 423/220, 242, 522, 530, 423/557, 566, 561

[56] References Cited

U.S. PATENT DOCUMENTS

| | | | |
|---|---|---|---|
| 2,215,754 | 9/1940 | Headlee | 423/242 R |
| 3,965,244 | 6/1976 | Sykes, Jr. | 423/228 |
| 3,966,875 | 6/1976 | Bratzler et al. | 423/220 |
| 4,100,256 | 7/1978 | Bozzelli et al. | 423/220 |
| 4,153,674 | 5/1979 | Verloop et al. | 423/573 R |
| 4,192,854 | 3/1980 | Harvey et al. | 423/220 |

Primary Examiner—Earl C. Thomas

[57] ABSTRACT

Process for removing carbon oxysulfide from a gas stream including contacting the gas stream with a scrubbing solution containing copper sulfate buffered to an acidic pH and removing at least some of the copper sulfides produced.

7 Claims, 1 Drawing Figure

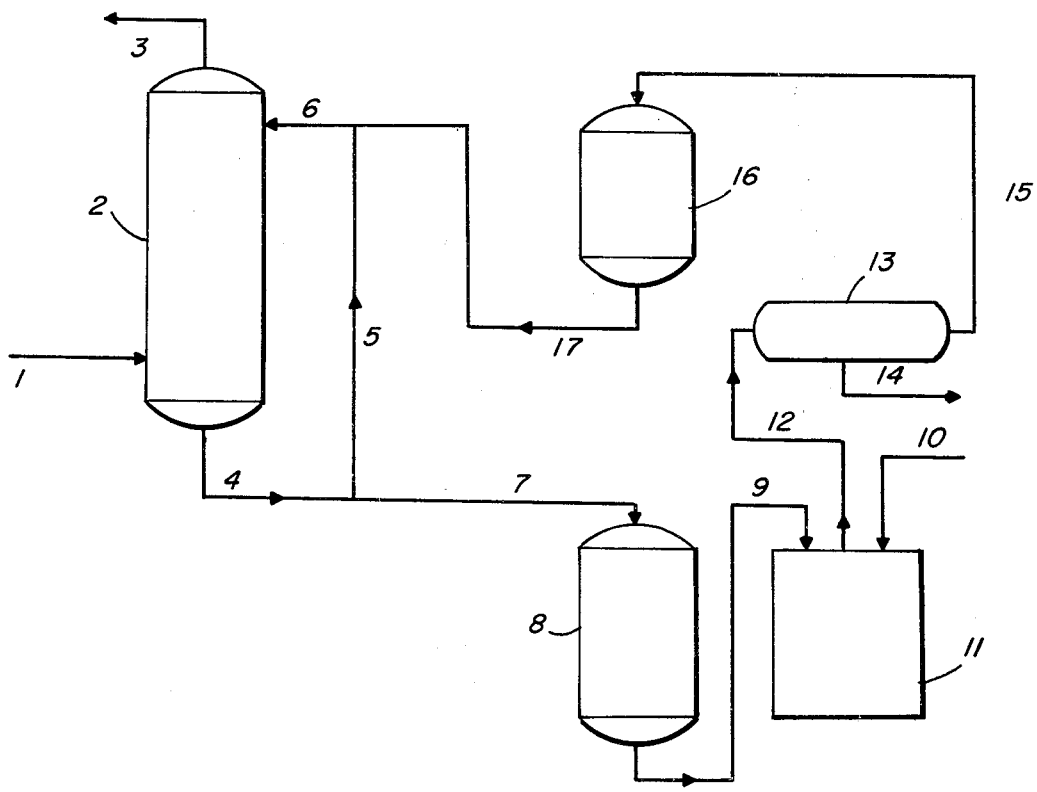

REMOVING CARBON OXYSULFIDE FROM GAS STREAMS

BACKGROUND OF THE INVENTION

This invention relates to selective removal of COS from gas streams.

It is often necessary or desirable to reduce the COS content of gas streams (e.g., coke oven gas or geothermal steam) to levels compatible with further processing or use. Generally, however, only a small fraction of the COS can be removed by the absorbent solutions used for removing other sulfur-containing impurities. For example, $H_2S$ can be removed by aqueous or water-containing solutions of organic bases or alkali salts of weak inorganic or organic acids, but COS is substantially unaffected by such solutions because it is chemically inert to the absorbent under conditions normally employed.

Physical scrubbing processes involving solubilization of impurities are also well known for treating acid gases. In general, COS has low solubility in the solvents used in such processes, and is not effectively removed.

One approach to the problem has been to convert COS to $H_2S$, which can then be removed in a conventional manner. Verloop et al. U.S. Pat. No. 4,153,674 (1979) describes one such process, which involves treating COS-containing gas with free hydrogen or free carbon monoxide at temperatures in the range of 180° C. to 450° C., in the presence of a catalyst consisting of a Group VI and/or Group VIII metal supported on an inorgainic oxide carrier, so as to convert most or all of the COS to $H_2S$ and $CO_2$.

Bratzler et al. U.S. Pat. No. 3,966,875 (1976) describes an alternative method by which, at 50° C. to 105° C., gas is contacted with a low volatility organic solvent inert to COS and containing 15 to 50 mole-percent water; the hydrolysis products ($H_2S$ and $CO_2$) and other sulfur-containing compounds are then removed by subsequent scrubbing of the gas.

Other process schemes involve hydrolyzing COS with an aqueous polyalkanolamine solution containing at least 20% by weight of tetramethylene sulfone (Sykes U.S. Pat. No. 3,965,244 (1976)) or using special amines, such as piperazinone, to catalyze hydrolysis (Bozzelli et al. U.S. Pat. No. 4,100,256 (1978)).

Generally, these absorption schemes are complex, particularly in conjunction with arrangements for regenerating the absorbing solutions. In addition, the mass action relation for hydrolysis of COS to $H_2S$ and $CO_2$ is displaced in the opposite (than desired) direction when the gas contains large quantities of carbon dioxide and hydrogen sulfide, causing intolerable concentrations of COS to persist in the treated gas. Furthermore, whenever COS is hydrolyzed to $H_2S$ and $CO_2$ by a basic solution, the $CO_2$ content of the absorbent (and, eventually, of the desorbed gases from regeneration of the absorbent) is undesirably increased.

Other sulfur removal schemes are based on the difference in absorption rates between $CO_2$ and $H_2S$. Because $CO_2$ and COS have similar absorption properties, such schemes remove only $H_2S$, but are not effective in removing COS.

Harvey et al. U.S. Pat. No. 4,192,854 (1980) describes a process for removing $H_2S$ from a gas stream involving contacting the stream with an ammonium sulfate-buffered $CuSO_4$ solution, which precipitates out the sulfur in $H_2S$ as copper sulfide. Nothing in the technical literature suggests that such a solution would be capable of reacting with COS.

While reduction of sulfur to low concentrations is required in most commercial applications, in a number of cases it is not necessary or desirable that carbon dioxide also be removed. For example, sour natural gas, which may contain several hundred ppm of COS in addition to substantial quantities of $H_2S$ and $CO_2$, must be desulfurized before it is used, but $CO_2$ need not be removed to meet current pipeline specifications for natural gas. Also, in certain gasification processes, removal of $CO_2$ is undesirable because it reduces the total volume of the gas available to generate power.

It is thus apparent that a process which selectively removes COS (and, if present, the other major form of sulfur, $H_2S$), but does not remove other acid gases, particularly $CO_2$, would be highly advantageous. Even in cases where it is desirable to remove $CO_2$, a selective process for COS removal would allow greater flexibility in the selection of a simultaneous or subsequent removal process for $CO_2$, as well as in the achievement of a $CO_2$ product stream of high purity.

SUMMARY OF THE INVENTION

We have discovered that the major portion of carbon oxysulfide (COS) in a gas stream can be removed by scrubbing the gas stream with a liquid solution containing copper sulfate buffered to a pH sufficiently acidic to prevent the precipitation of basic copper salts at operating conditions. The copper sulfate reacts with the COS according to the equation:

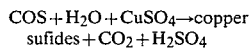

$$COS + H_2O + CuSO_4 \rightarrow \text{copper sufides} + CO_2 + H_2SO_4$$

Sulfur is removed from the system in the form of CuS, elemental sulfur, $H_2SO_4$, or any combination of the three. $CO_2$ is not affected because it is essentially insoluble in the acidic scrubbing solution.

In preferred embodiments, the pH of the scrubbing solution is maintained below 4, preferably between 1 and 4, using ammonium sulfate. The scrubbing solution is recirculating, and the copper sulfides produced are hydrothermally oxidized to regenerate copper sulfate, which is returned to the scrubbing solution for further COS removal.

DESCRIPTION OF THE PREFERRED EMBODIMENT

We turn now to the description of the preferred embodiment, after first briefly describing the drawing.

DRAWING

The FIGURE is a diagrammatic representation of apparatus useful in practicing the method of the invention.

EMBODIMENT

There is shown in the FIGURE a diagrammatic representation of apparatus for removing COS from a gas stream. Raw gas containing COS (and, usually, other constituents, e.g., $CO_2$, $H_2S$, and $N_2$) is first saturated with water vapor (apparatus not shown) in a cooler, or by the injection of steam, to increase the pressure of the gas to about 100 psig, and to adjust its temperature to about 100° C. The gas is then introduced into absorption column 2 via line 1. Absorption column 2, a tray type tower, contains the scrubber solution, which flows countercurrently to the gas. The dilute scrubber solution contains 4 g/l (in terms of copper) $CuSO_4$, 100 g/l $(NH_4)_2SO_4$, and 25 g/l $H_2SO_4$.

In absorption column 2, most of the COS in the gas reacts with the $CuSO_4$, producing copper sulfides, $CO_2$, and sulfuric acid. (Any $H_2S$ in the gas is removed as well, forming copper sulfides and sulfuric acid). Purified gas, free of sulfur, leaves absorption column 2 via line 3.

In the course of absorption, the copper sulfate solution tends to become an acidic slurry containing suspended copper sulfide solids. Some of this slurry is recirculated through the absorption tower via lines 4, 5 and 6, while a portion of it is withdrawn as a purge stream through line 7.

The withdrawn slurry is accumulated in surge tank 8 while the solids are kept in suspension by agitation. A portion of this slurry is fed, via line 9, to leach reactor 11, where a portion of the copper sulfide solids are hydrothermally oxidized with air, which enters via line 10, for one hour to yield copper sulfate and sulfur. Excess sulfuric acid is also consumed during this step.

The regenerated solution is fed via line 12, to solid/liquid separation device 13, where elemental sulfur and copper sulfides are removed via line 14. The clear solution is fed to tank 16 via line 15, and from there is fed, via line 17, back to absorption column 2 for further COS absorption.

The method described above, when used to treat one million pounds per hour of raw gas containing 500 ppm by weight of COS, requires about 5000 gpm of scrub solution to be recirculated through absorption column 2; about 150 gpm of the solution are withdrawn as a slurry (approximately 1% in solids) through line 7. Regeneration of copper sulfides consumes about 125 lbs/hr of oxygen (derived from air). About 250 lbs/hr of sulfur is rejected from the system via line 14.

OTHER EMBODIMENTS

Other embodiments are within the following claims. For example, the $CuSO_4$ concentration in the scrubber solution can range from about 2 g/l to 40 g/l (in terms of copper), and can be employed in any known scrubbing device, e.g., a packed column or a venturi scrubber. Sulfuric acid, rather than being consumed during the regeneration step, can be rejected from the system, or neutralized by the addition of a base, e.g., NaOH, CaO, $Ca(OH)_2$, or $NH_3$. If CaO or $CaOH_2$ is used for neutralization, calcium sulfate is rejected from the system in the regeneration step. Some CuS produced during the scrubbing process can be immediately rejected from the system; this is the preferred method of sulfur elimination when recirculation and regeneration are not employed.

I claim:

1. A process for removing carbon oxysulfide from a gas stream, comprising
   contacting said gas stream with a liquid stream comprising a liquid solution of a scrubbing agent comprising copper sulfate buffered to a pH sufficiently acidic to prevent the precipitation of basic copper salts at operating conditions, thereby to react said copper sulfate with said carbon oxysulfide to precipitate copper sulfides, and
   removing at least some of said copper sulfides from said liquid solution.

2. The process of claim 1, wherein said liquid solution is buffered to an acidic pH by ammonium sulfate.

3. The process of claim 1 or claim 2, wherein said liquid solution is recirculating.

4. The process of claim 3, further comprising hydrothermally oxidizing at least some of said copper sulfides to regenerate copper sulfate.

5. The process of claim 4, further comprising returning said regenerated copper sulfate to said liquid stream.

6. The process of claim 1, wherein said pH is no higher than 4 measured at room temperature.

7. The process of claim 6, wherein said pH is between 1 and 4 measured at room temperature.

* * * * *